United States Patent [19]
Lee

[11] Patent Number: 5,956,188
[45] Date of Patent: Sep. 21, 1999

[54] TILT-ADJUSTING STRUCTURE FOR AN AXIAL SLIDE TYPE OPTICAL PICKUP ACTUATOR

[75] Inventor: Kwan-Chul Lee, Koyang-Si, Rep. of Korea

[73] Assignee: Daewoo Electronics Co., Ltd., Seoul, Rep. of Korea

[21] Appl. No.: 09/221,132

[22] Filed: Dec. 28, 1998

[30] Foreign Application Priority Data

Sep. 30, 1998 [KR] Rep. of Korea .................. 98-18733

[51] Int. Cl.⁶ ................................ G02B 7/02; G11B 7/00
[52] U.S. Cl. .................... 359/822; 359/823; 369/44.14
[58] Field of Search .................... 359/813, 814, 359/819, 822, 823, 824; 369/44.11, 44.15, 44.16, 44.17, 44.18, 44.19, 44.2, 44.21

[56] References Cited

U.S. PATENT DOCUMENTS 4,101,008 7/1978 Frosh et al. ............................. 188/1
5,488,594 1/1996 Kobayashi et al. ................. 369/44.14

Primary Examiner—Georgia Epps
Assistant Examiner—Ricky Mack
Attorney, Agent, or Firm—Jacobson, Price, Holman & Stern, PLLC

[57] ABSTRACT

The yoke is formed in a cylindrical shape and has a curved surface for adjusting the tilt of the optical pickup actuator. The cover is engaged with the yoke and is formed to accommodate the lens holder. The cover includes an adjustment screw engagement portion protruding in a radial direction on the outer periphery of the cover, the spring hanger portion protruding in a radial direction on the outer periphery of the cover, and a shaft protruding from the bottom of the cover. The base has an adjustment groove and a spring fixing protrusion. The adjustment groove accommodates an adjustment screw, the adjustment screw engagement portion is engaged with the cover through the adjustment screw accommodated in the adjustment groove, and the spring fixing protrusion is engaged with the spring hanger portion through the spring.

3 Claims, 4 Drawing Sheets

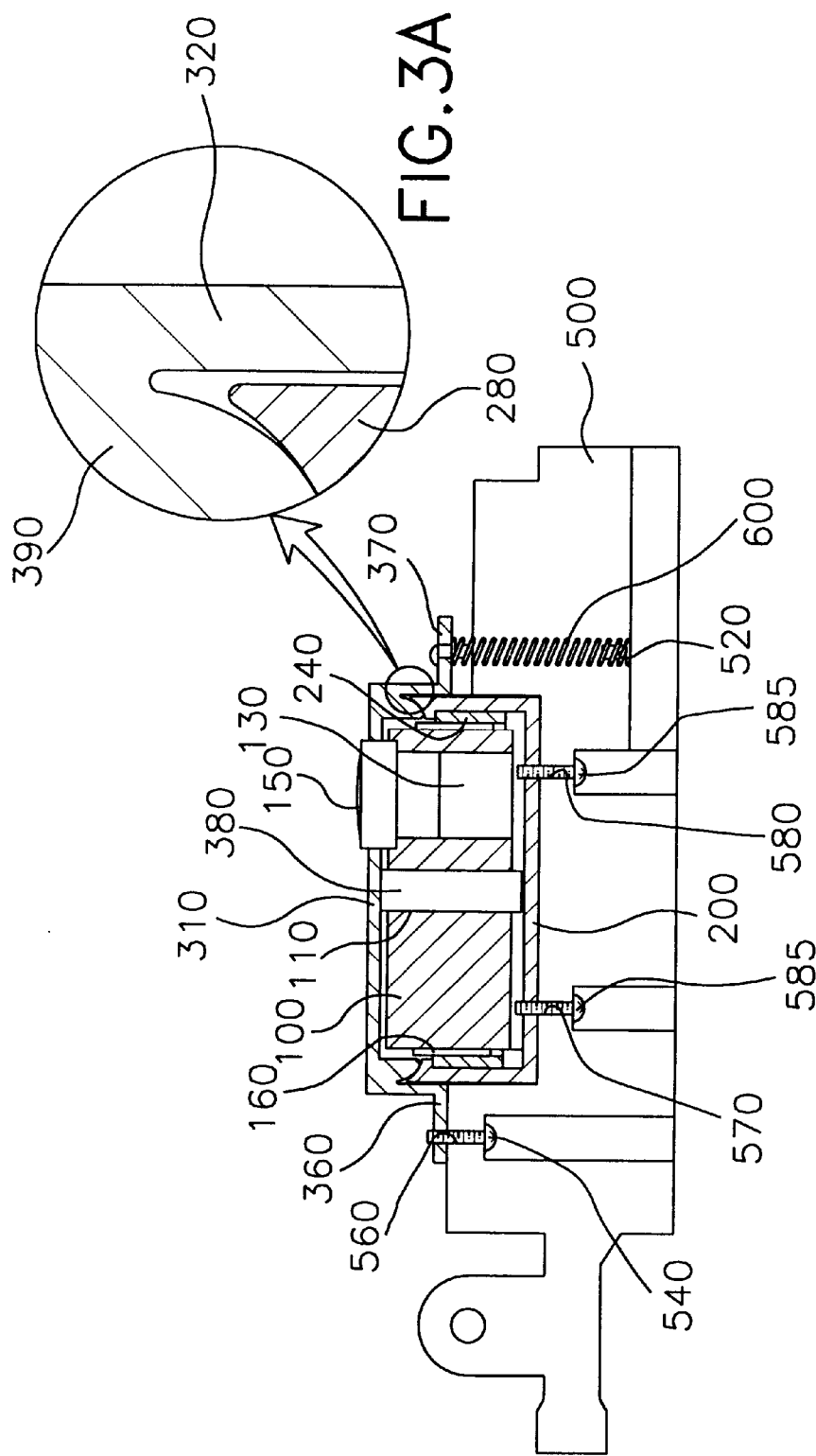

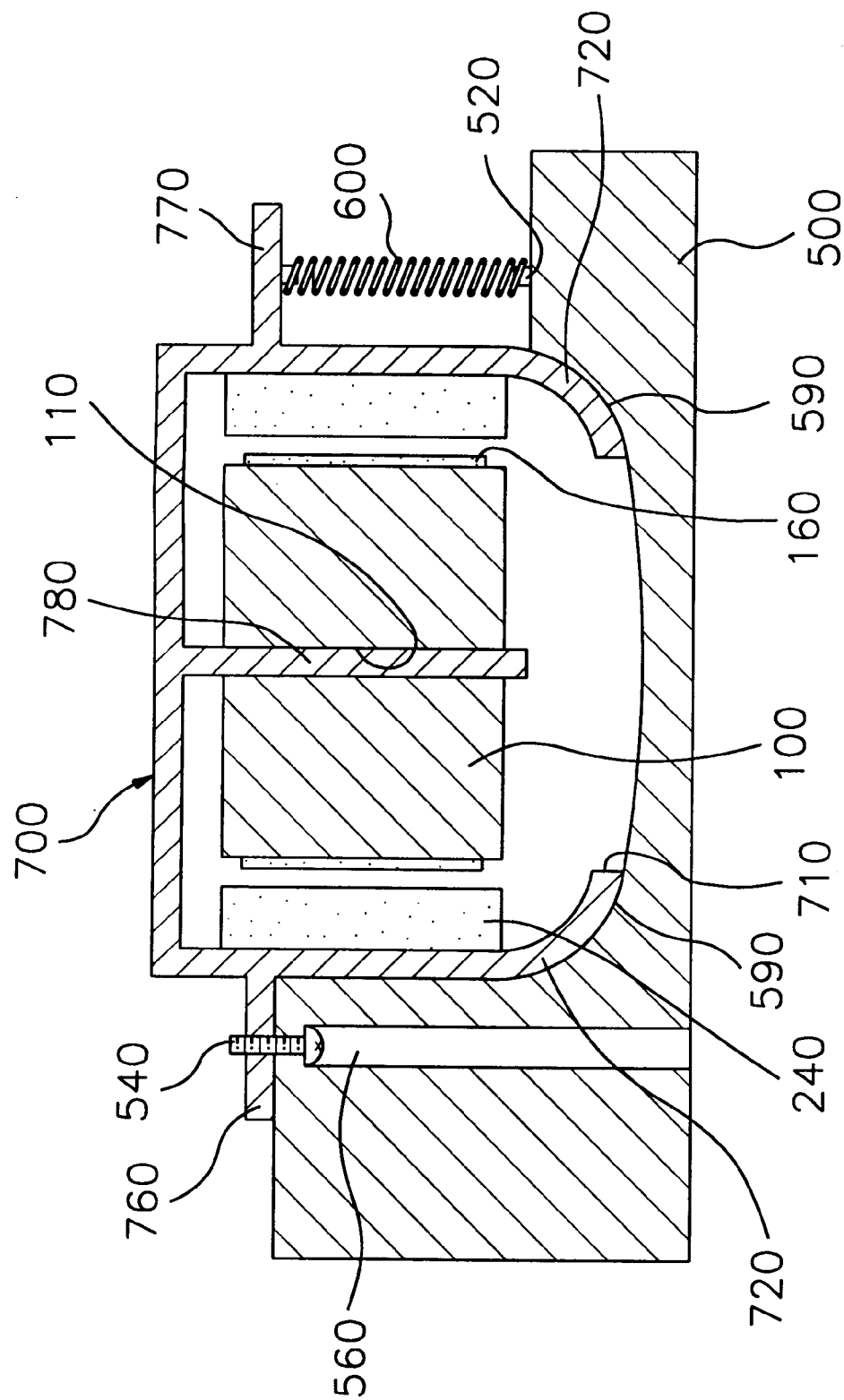

TILT-ADJUSTING STRUCTURE FOR AN AXIAL SLIDE TYPE OPTICAL PICKUP ACTUATOR

BACKGROUND OF THE INVENTION

1. Field of the Invention

The present invention relates to a tilt-adjusting structure for an axial slide type optical pickup actuator, and more particularly to a tilt-adjusting structure for an axial slide type optical pickup actuator having a sliding surface on the protecting cover of a lens holder.

2. Description of the Prior Art

In recent years, data retrieving/recording systems for an optical disc such as a laser disc or a compact disc have been developed. In order to retrieve and record information from/to the optical disc, an optical pickup apparatus is provided for irradiating a laser beam along a track on the optical disc and retrieving data based on a beam reflected from the track. In case a track is formed in a spiral shape on the optical disc, sectors of a track have different distances from the center of the optical disc due to the eccentricity of the spiral shape. Accordingly, the tracking control operation is essential for exactly irradiating the laser beam on the track in a retrieving mode. Further, the distance between the optical pickup apparatus and the optical disc minutely changes since the optical disc is rotated in the retrieving mode. Therefore, the focusing control operation is essential since such distance change causes the exact retrieval of data to be difficult.

For the focusing control operation, a focusing error is detected from the laser beam reflected from the optical disc. A focusing error signal, which is generated when the focusing error is detected, drives the objective lens for performing the focusing control operation. In general, the objective lens is fixedly supported by a spring on an optical head housing. The optical pickup actuator having coils for moving the objective lens up and down along the axial direction of the laser beam is activated.

The optical pickup actuator as mentioned above requires a tilt adjustment during its assembling process.

Hereinafter, the tilt-adjusting structure of a conventional axial slide type optical pickup actuator will be described with reference to FIG. 1.

As shown in FIG. 1, the conventional optical pickup actuator is constituted with a cylindrical lens holder 10 and a yoke 20. The tilt-adjusting structure of the conventional optical pickup actuator comprises an optical pickup actuator, a cover 30, a tilt-adjusting plate 40, a base 50.

The lens holder 10 has an axial opening 11, penetrated from top to bottom, in the center of a cylindrical body. The lens holder 10 has a first laser beam through hole 12 and a second laser beam through hole 13 in the same radius from the axial opening 11. A first objective lens 14 is mounted in the upper portion of the first laser beam through hole 12 and a second objective lens 15 is mounted in the upper portion of the second laser beam through hole 13. Winding coils 16 are fixed 90° apart to each other on the outer periphery of the lens holder 10. Magnetizable materials 17 are fixed in the center portions of the winding coils, respectively, and between the winding coils and the outer periphery of the lens holder 10. The yoke 20 is formed in a cylindrical shape to accommodate the lens holder 10. The lens holder 10 is connected with the yoke 20 by inserting a shaft 21 into the axial opening 11. The shaft 21 protrudes upwards from the center of the yoke 20. An opening 22 is formed corresponding to the first and second laser beam through holes 12 and 13. A first magnet pair 23 and a second magnet pair 24 are fixed along the inner periphery of the yoke 20, so that the first and second magnet pairs 23 and 24 correspond to the winding coils 16, respectively. A latch 25 is formed on one portion of the outer periphery of the yoke 20. Release preventing protrusions 26 are formed apart in a certain interval to each other in the radial direction on the outer periphery of the yoke 20.

The cover 30 prevents foreign materials such as dust from having contact with the lens holder 10. Further, the cover 30 has a upper plate 31 and a skirt portion 32 formed downwardly from the bottom of the upper plate 31. The upper plate 31 and the skirt portion 32 prevent the lens holder 10 from releasing in the laser beam axial direction. One portion of the upper plate 31 has a rotation limit opening 33 for limiting a rotation angle of the lens holder 10. A groove 34 is formed on the skirt portion 32 corresponding to the first latch portion 25. A release preventing opening 35 is formed corresponding to the release preventing protrusions 26. Accordingly, the cover 30 is connected with the yoke 20, the first latch portion 25 is accommodated in the groove 34, and the release preventing protrusions 26 are engaged with the release preventing opening 35.

The tilt-adjusting plate 40 is fixed on one side of the outer bottom of the yoke 20. The tilt-adjusting plate 40 has a convex tilt-adjusting surface 41. The convex tilt-adjusting surface 41 is convex toward the base 50. The base 50 has a concave tilt-adjusting surface 51 to fit with the convex tilt-adjusting surface 41. The base 50 has first and second through holes 53 and 54 at positions of forming an isosceles triangle, a vertex of which is a second latch portion 52. A first adjustment screw 55 adjusts the tilt of the optical pickup actuator. The first adjustment screw 55 is screwed through the first through hole 53 into the adjustment hole of the first adjustment portion 27 which protrudes in the radial direction from the outer periphery of the yoke 20. A second adjustment screw 56 adjusts the tilt of the optical pickup actuator. The second adjustment screw 56 is screwed through a second through hole 54 into second adjustment hole of the second adjustment portion 36 which protrudes in the radial direction from the outer periphery of the skirt portion 32. A spring 60 connects the first latch portion 25 of the yoke 20 with the second latch portion 52 of the base 50.

Operations of the tilt-adjusting structure of the conventional optical pickup actuator will be described in detail hereinafter.

The tilt adjusting plate 40 is fixed on the outer bottom of the yoke 20, and the spring 60 and the first and second adjustment screws 55 and 56 enables the yoke 20 to be mounted on the base 50. The lens holder 10 is fixedly connected with the yoke 20 through the shaft 21, and the level degree of the first and second objective lens 14 and 15 is checked. At this time, the tilt of the shaft 21 is changed by rotating the first and second adjustment screws 55 and 56 and adjusting the spring 60. When the objective lenses 14 and 15 are in a level state, the yoke 20 is fixed on the base 50.

In the meantime, in the tilt-adjusting structure of the conventional axial slide type optical pickup actuator as mentioned above, the tilt-adjusting plate 40 has a convex tilt-adjusting surface 41 for adjusting a level degree of the objective lenses 14 and 15. Further, the concave tilt-adjusting surface 51 is formed on the base 50 at a position corresponding to the concave tilt-adjusting surface 41. The second adjustment portion 36 is formed on the cover 30, and the first adjustment portion 27 is formed on the yoke 20. In particular, the convex and concave tilt-adjusting surfaces 41 and 51 are precisely machined. Unless the convex and concave tilt-adjusting surfaces 41 and 51 are precisely machined, the tilt of the optical pickup actuator may not be precisely adjusted since the tilt-adjusting plate 40 is not supported on the base 50.

Secondly, the tilt-adjusting margin is small since the yoke 20 is fixed on the base 50 and the shaft 21 protrudes upwardly from the bottom of the yoke 20.

Thirdly, more parts are required since the tilt-adjusting plate 40 is separately provided and fixed on the base 20. Accordingly, the number of manufacturing processes increases and the productivity of a product becomes low.

SUMMARY OF THE INVENTION

It is the first object of the present invention to provide a tilt-adjusting structure of the axial slide type optical pickup actuator capable of exactly adjusting tilt.

It is the second object of the present invention to provide a tilt-adjusting structure of the axial slide type optical pickup actuator having a large tilt adjustment margin.

It is the third object of the present invention to provide a tilt-adjusting structure of the axial slide type optical pickup actuator capable of enhancing productivity by reducing the manufacturing process.

In order to achieve the above objects, a tilt-adjusting structure of an axial slide type optical pickup actuator has a lens holder, a yoke, a cover, and a base. The lens holder has a laser beam through holes and axial opening, magnetizable materials are mounted on an outer periphery of the lens holder, the yoke accommodates the lens holder, the cover covers the lens holder, and the base supports the yoke. The tilt-adjusting structure comprises the yoke formed in a cylindrical shape and having a curved surface for adjusting a tilt of the optical pickup actuator, the cover engaged with the yoke and formed to accommodate the lens holder. The cover includes an adjustment screw engagement portion protruding in a radial direction on the outer periphery of the cover, a spring hanger portion protruding in the radial direction on the outer periphery of the cover, and a shaft protruding from a bottom of the cover. The base has an adjustment groove and a spring fixing protrusion. The adjustment groove accommodates an adjustment screw, the adjustment screw engagement portion is engaged with the cover through the adjustment screw accommodated in the adjustment groove, the spring fixing protrusion is engaged with the spring hanger portion through the spring.

The curved surface is formed along an upper portion of the yoke in order for a slope of the curved surface to sharpen from an inner surface to an outer surface of the periphery of the yoke, and the cover has a curved surface with a slope decreasing in the axial direction, to thereby fit to the curved surface of the cover.

A lens holder has winding coils on an outer periphery thereof and an axial opening therein. A lens holder reception part is formed in a cylindrical shape. A lens holder includes an opening formed in the bottom of the lens holder reception part and for accommodating the lens holder, a shaft protruding from the center portion of the lens holder reception part, a first curved adjustment surface curved inside from the outer periphery of the lens holder reception part, an adjustment screw engagement portion protruding in the radial direction from the outer periphery of the lens holder reception part, and a spring hanger portion protruding in the radial direction from the outer periphery of the lens holder reception part, and spaced apart from the adjustment screw engagement portion.

A base has an adjustment groove accommodating an adjustment screw, a spring fixing protrusion engaged with the spring hanger portion through the spring, and a second curved adjustment surface formed corresponding to the first curved adjustment surface.

The tilt-adjusting structure of the axial slide type optical pickup actuator according to the present invention has 1) a large tilt-adjusting margin since the shaft and the cover are formed in one body, 2) an easy tilt adjustment since the tilt is adjusted by adjusting the cover in the state that the yoke is fixed, 3) less constituents since the first and second curved surfaces of the yoke and the cover are formed through an injection molding, and 4) less assembling process due to fewer constituents.

BRIEF DESCRIPTION OF THE DRAWINGS

These and other objects and features of the present invention can be understood through the following embodiment by reference to the accompanying drawing, in which:

FIG. 3 is a vertically cross-sectioned view of a tilt-adjusting structure of an axial slide type optical pickup actuator according to the first embodiment of the present invention; and FIG. 4 is a vertically cross-sectioned view of a tilt-adjusting structure of an axial slide type optical pickup actuator according to the second embodiment of the present invention.

DETAILED DESCRIPTION OF THE PREFERRED EMBODIMENTS

Hereinafter, the tilt-adjusting structures of an axial slide type optical pickup actuator according to the embodiments of the present invention will be described in detail with reference to the accompanying drawings.

Figure 1:
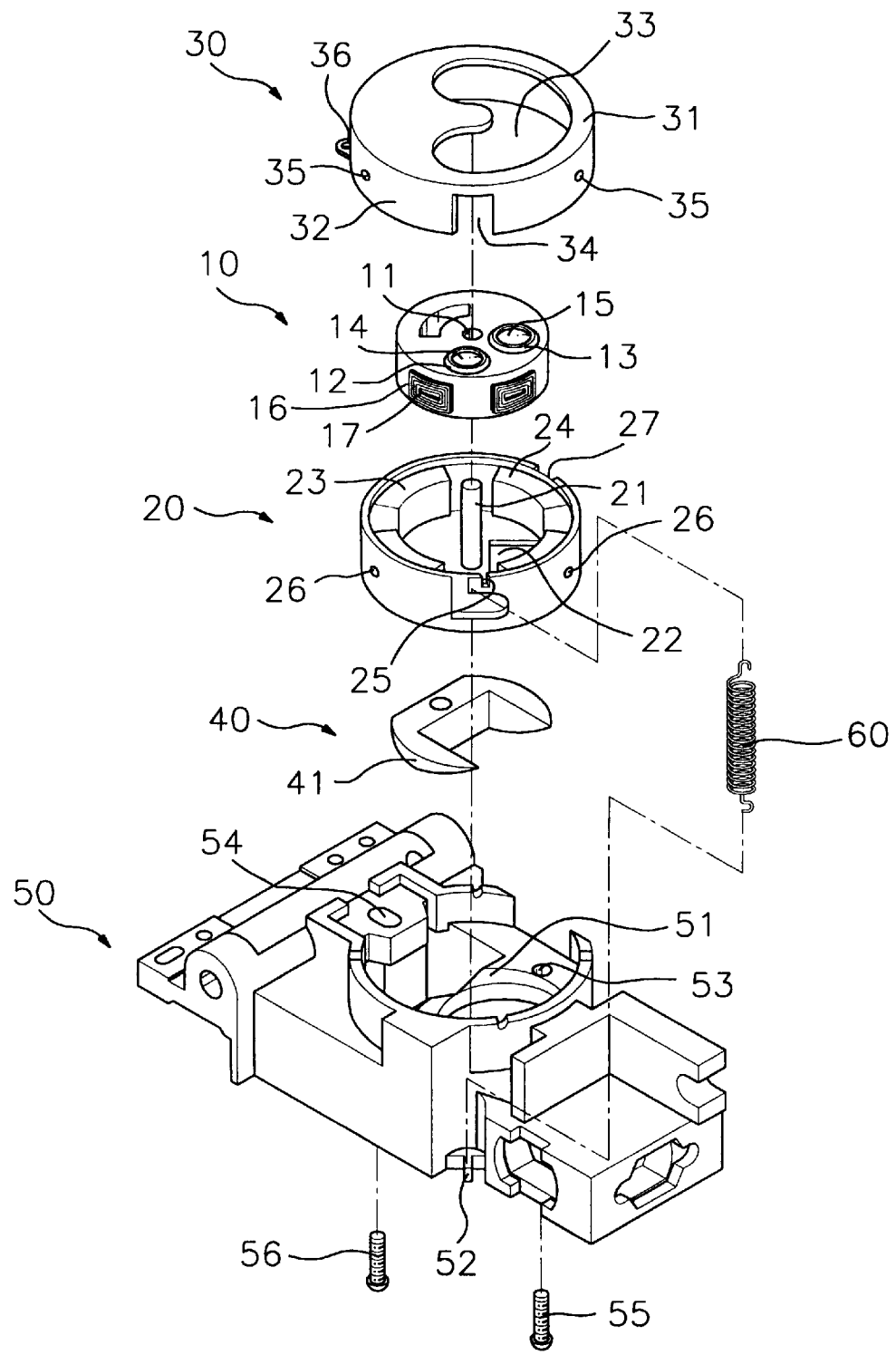
FIG. 1 is an exploded view of a tilt-adjusting structure of a conventional axial slide type optical pickup actuator.
Figure 2:
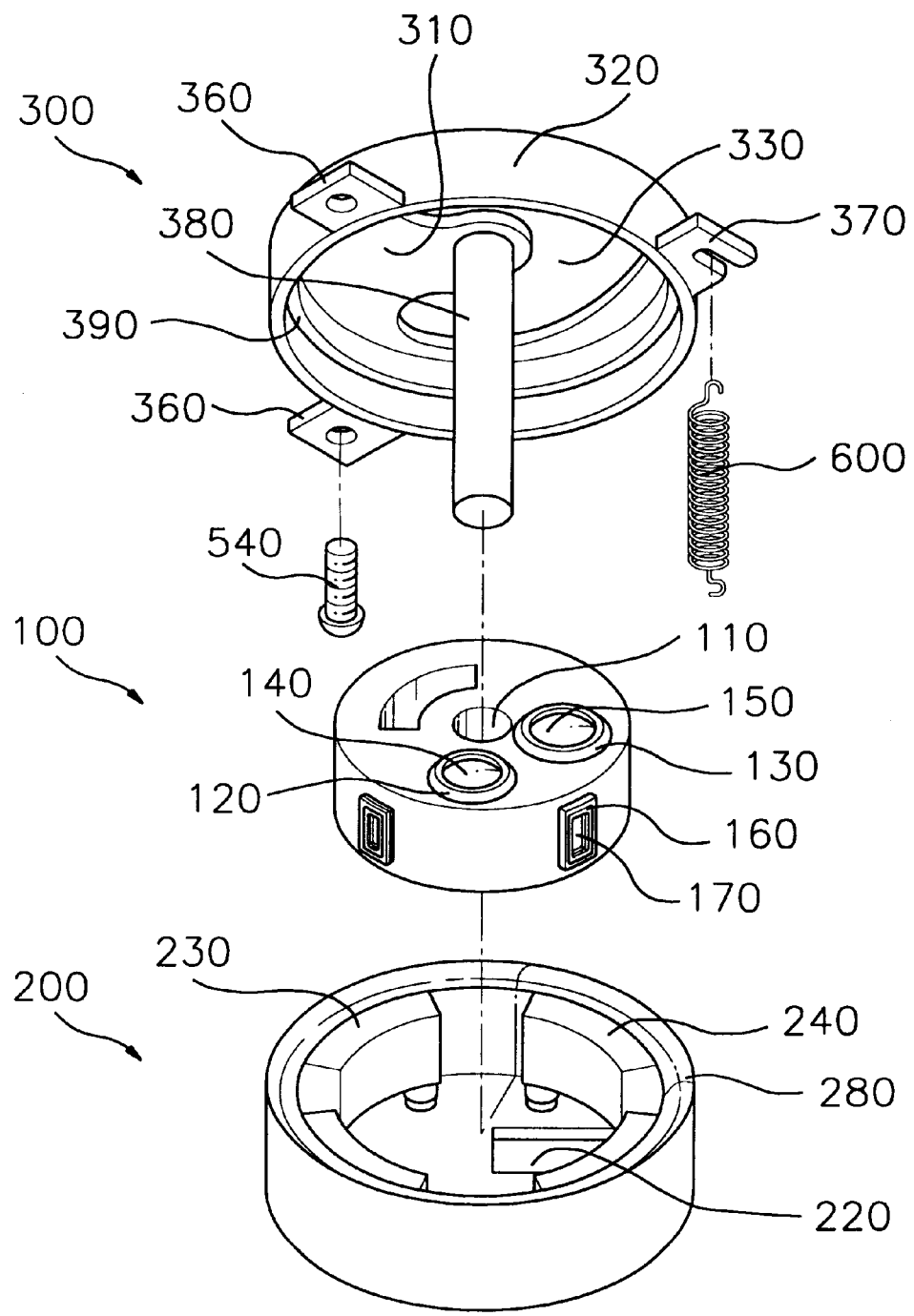
FIG. 2 is an exploded view of a tilt-adjusting structure of an axial slide type optical pickup actuator according to the first embodiment of the present invention.

The tilt-adjusting structure of an axial slide type optical pickup actuator according to the first embodiment of the present invention is shown in FIGS. 2 and 3.

The optical pickup actuator according to the first embodiment of the present invention comprises a cylindrical lens holder 100 and a yoke 200. The tilt-adjusting structure of the optical pickup actuator includes the optical pickup actuator, a cover 300, and a base 500. The lens holder 100 has an axial opening 110 penetrating from top to bottom in the center of a cylindrical body, a first through hole 120 and a second through hole 130 which are formed at positions spaced apart at a certain distance from the axial opening 110. The first objective lens 140 is mounted in the upper portion of the first through hole 120, and the second objective lens 150 is mounted in the upper portion of the second through hole 130. Winding coils 160 are spaced 90° degree apart to each other and fixed on the outer periphery of the lens holder 100. Magnetizable materials 170 are fixed in the center portion of the winding coils 160.

The yoke 200 has an open cylindrical shape to accommodate the lens holder 100. An opening 220 is formed in the bottom of the yoke 200 at a position corresponding to the first and second through holes 120 and 130. First and second magnet pairs 230 and 240 are alternately fixed on positions corresponding to the winding coils 160 on the inner periphery of the yoke 200. The first curved surface 280 is formed along the upper portion of the periphery of the yoke 200. The slope of the first curved surface 280 gets sharper from the inner periphery surface to the outer periphery surface of the yoke 200.

The cover 300 has a disc-shaped upper plate 310 and a skirt portion 320. The upper plate 310 prevents foreign materials such as dust, etc. from coming in contact with the lens holder 100, and prevents the lens holder 100 from being released from the yoke 200. The skirt portion 320 is a portion protruding downwardly from the periphery of the disc-shaped upper plate 310. A rotation limit opening 330 is formed on the one side of the upper plate 310 to limit a rotation angle of the lens holder 100. A shaft 380 downwardly protrudes from the center of the bottom of the upper plate 310, and the shaft 380 is connected with the axial opening 110. The skirt portion 320 has two adjustment screw engagement portions 360 protruding outwardly in the radial directions in a certain interval. A spring hanger portion 370 is formed in the radial direction to form an isosceles triangle with the adjustment screw engagement portions 380. A second curved surface 390 is formed along the inner periphery surface of the skirt portion 320, and the slope of the upper portion of the second curved surface decreases toward the shaft 390, so that the second curved surface can be fitted with the first curved surface 280. The base 500 has screw openings 560 at positions corresponding to the adjustment screw engagement portions 360. The base 500 has a spring fixing protrusion 520 protruding at the position corresponding to the spring hanger portion 370. Yoke fixing openings 570 and 580 are formed in the center portion of the yoke 500 for fixing the yoke 200. The yoke 200 is fixed to the base 500 by using the screws 585. The cover 300 is engaged with the base 500 by screwing the adjustment screw engagement portion 360 and the screw opening 560 by the adjustment screw 540 and by engaging both ends of the spring 600 with the spring hanger portion 370 and the spring fixing protrusion 520.

The assembling process for the tilt-adjusting structure of the axial slide type optical pickup actuator as mentioned above will be described hereinafter.

The yoke 200 is fixed to the base 500 by engaging the yoke fixing opening 580 and the bottom of the yoke 200 with the screws 585. The lens holder 100 is mounted in the yoke 200. The shaft 380 of the cover 300 is inserted into the axial opening 110 of the lens holder 100. At this time, the first curved surface 280 is fitted to the second curved surface 390. The adjustment screw engagement portion 360 is screwed with the screw opening 560 through the adjustment screw 540. One end of the spring 600 is fixed to the spring hanger portion 370 and the other end of the spring 600 is fixed to the spring fixing protrusion 520. While screwing the two adjustment screws 540, the vertical degree of the shaft 380 is checked with a tilt checking device(not shown). Depending on the screwing of the adjustment screw 540, the cover 300 is tilted while the second curved surface 390 slides on the first curved surface 280, so that the vertical degree of the shaft 380 may be adjusted. With the above process, when the shaft 380 is exactly in a vertical position, the adjustment screw 540 is fixed with adhesive so as to fix the position of the cover 300.

The tilt-adjusting structure of the axial slide type optical pickup actuator according to the first embodiment of the present invention has 1) a large tilt-adjusting margin since the shaft and the cover are formed in one body, 2) an easy tilt adjustment since the tilt is adjusted by adjusting the cover in the state that the yoke is fixed, 3) less constituents since the first and second curved surfaces of the yoke and the cover are formed through an injection molding, and 4) less assembling process due to fewer constituents.

A tilt-adjusting structure of the axial slide type optical pickup actuator according to the second embodiment of the present invention will be described with reference to FIG. 4.

The tilt-adjusting structure according to the second embodiment of the present invention has a lens holder 100, a lens holder reception part 700, and a base 500. The lens holder 100 is formed in a cylindrical shape, has winding coils 160 on the outer periphery thereof and an axial opening 110 in the center portion thereof. The lens holder reception part 700 has a cylindrical body and an opening 710 in the bottom thereof for receiving the lens holder 100. The lens holder reception part 700 has a shaft 780 vertically protruding from the center portion thereof. The lens holder reception part 700 has a first curved adjustment surface 720 curved inside from the outer periphery thereof. An adjustment screw engagement portion 760 protrudes in the radial direction from the outer periphery of the lens holder reception part 700. A spring hanger portion 770 protrudes apart from the adjustment screw engagement portion 760 and in the radial direction from the outer periphery of the lens holder reception part 700. The base 500 has an adjustment groove 560 to be screwed with the adjustment screw engagement portion 760 of the lens holder reception part 700 by an adjustment screw 540. The base 500 has a spring fixing protrusion 520 which is engaged with the spring hanger portion 770 of the lens holder reception part 700 by the spring 600. The base 500 has a second curved adjustment surface 590 to which the first curved adjustment surface 720 corresponds and to which the first curved adjustment surface 720 is fitted.

The assembling process of the tilt-adjusting structure according to the second embodiment will be described hereinafter. Firstly, the lens holder 100 is inserted into the lens holder reception part 700 through the opening 710. At this time, the shaft 780 is inserted into the axial opening 110. In the state that the lens holder 100 is engaged with the lens holder reception part 700, the lens holder reception part 700 is mounted on the base 500 in order for the first curved adjustment surface 720 to be in contact with the second curved adjustment surface 590. One end of the spring 600 is fixed to the spring hanger portion 770 of the lens holder reception part 700. The other end of the spring 600 is fixed to the spring fixing protrusion of the base 500. The adjustment screw 540 is inserted into the adjustment groove 560, so that the base 500 is engaged with the adjustment screw engagement portion 760. While the adjustment screw 540 is screwed, the vertical degree of the shaft 780 is checked with the tilt checking device(not shown). Depending on the screwing of the adjustment screw 540, the first curved adjustment surface 720 slides on the second curved adjustment surface 590, so that the vertical degree of the shaft 780 may be adjusted. With the above process, when the shaft 780 is exactly vertical with respect to the bottom of the base 500, the adjustment screw 540 is fixed with adhesive 540 to prevent the lens holder reception part 700 from moving about.

The tilt-adjusting structure of the axial slide type optical pickup actuator according to the second embodiment of the present invention has 1) an easy tilt adjustment and a large tilt adjustment margin since the shaft is formed in one body with the lens holder reception part, 2) less constituents since the lens holder reception part plays a role of the conventional yoke and cover, and 3) less assembling process due to fewer constituents.

It is understood that various other modification will be apparent to and can be readily made by those skilled in the art without departing from the scope and spirit of this invention. Accordingly, it is not intended that the scope of the claims appended thereto be limited to the descriptions set forth herein, but rather that the claims be constructed as encompassing all the features of the patentable novelty that reside in the present invention, including all the features that would be treated as equivalent thereof by those skilled in the art to which this pertains.

What is claimed is:

1. A tilt-adjusting structure of an axial slide type optical pickup actuator having a lens holder, a yoke, a cover, and a base, the lens holder having a laser beam through holes and an axial opening, magnetizable materials being mounted on an outer periphery of the lens holder, the yoke accommodating the lens holder, the cover covering the lens holder, and the base supporting the yoke, the tilt-adjusting structure comprising:

the yoke formed in a cylindrical shape and having a curved surface for adjusting a tilt of the optical pickup actuator;

the cover engaged with the yoke and formed to accommodate the lens holder, including:
        an adjustment screw engagement portion protruding in a radial direction on the outer periphery of the cover;
        a spring hanger portion protruding in the radial direction on the outer periphery of the cover; and
        a shaft protruding from the bottom of the cover; and the base having an adjustment groove and a spring fixing protrusion, the adjustment groove accommodating an adjustment screw, the adjustment screw engagement portion being engaged with the cover through the adjustment screw accommodated in the adjustment groove, the spring fixing protrusion being engaged with the spring hanger portion through the spring.

2. The tilt-adjusting structure as claimed in claim 1, wherein a curved surface is formed along an upper portion of the yoke in order for a slope of the curved surface to sharpen from an inner surface to an outer surface of the periphery of the yoke, and the cover has a curved surface with a slope decreasing in the axial direction, to thereby fit to the curved surface of the cover.

3. A tilt-adjusting structure of an axial slide type optical pickup actuator, comprising:

a lens holder having winding coils on an outer periphery thereof and an axial opening therein;

a lens holder reception part formed in a cylindrical shape, including:
        an opening formed in the bottom of the lens holder reception part and for accommodating the lens holder,
        a shaft protruding from the center portion of the lens holder reception part,
        a first curved adjustment surface curved inside from the outer periphery of the lens holder reception part,
        an adjustment screw engagement portion protruding in a radial direction from the outer periphery of the lens holder reception part, and
        a spring hanger portion protruding in a radial direction from the outer periphery of the lens holder reception part, and spaced apart from the adjustment screw engagement portion; and a base having an adjustment groove accommodating an adjustment screw, a spring fixing protrusion being engaged with the spring hanger portion through the spring, and a second curved adjustment surface formed to correspond to the first curved adjustment surface.

* * * * *